United States Patent

Howe

[15] 3,671,766
[45] June 20, 1972

[54] OSCILLATING MECHANISM

[72] Inventor: Spencer D. Howe, Los Angeles, Calif.

[73] Assignee: Hughes Aircraft Company, Culver City, Calif.

[22] Filed: June 29, 1970

[21] Appl. No.: 56,094

Related U.S. Application Data

[63] Continuation of Ser. No. 766,699, Oct. 11, 1968, abandoned.

[52] U.S. Cl. ................................310/39, 318/134, 335/272, 350/6
[51] Int. Cl. ..........................................H02k 33/18
[58] Field of Search .........................310/36–39, 49, 310/15, 28, 29, 31–35, 69, 164; 318/134, 119, 120, 126–129; 340/146.3; 356/93, 95, 97; 350/6, 266; 335/272, 274, 276, 69, 75, 76, 138, 219, 235, 288

[56] References Cited

UNITED STATES PATENTS

| 3,020,414 | 2/1962  | McKnight et al. | 350/6 X  |
|-----------|---------|-----------------|----------|
| 3,341,689 | 9/1967  | Reichenbach     | 310/39 X |
| 3,463,948 | 8/1969  | Farre           | 310/36 X |
| 2,583,789 | 1/1952  | Mejean          | 310/39 X |
| 3,532,408 | 10/1970 | Dostal          | 350/6    |
| 3,436,139 | 4/1969  | Barkow          | 350/6    |
| 3,140,376 | 7/1964  | Tilse et al.    | 310/39 X |
| 3,011,100 | 11/1961 | Spinelli et al. | 310/36 X |
| 3,372,291 | 3/1968  | Lytle et al.    | 310/49   |
| 3,344,378 | 9/1967  | Wilhelmson      | 335/272  |
| 2,422,861 | 6/1947  | Skrobisch       | 335/274 X |

*Primary Examiner*—J. D. Miller
*Assistant Examiner*—B. A. Reynolds
*Attorney*—Lewis B. Sternfels

[57] ABSTRACT

The invention teaches a mirror oscillating through an angular arc defined by arc terminal points. Springs associated with the mirror absorb the kinetic energy of halt at the terminal points and provide the primary driving force and energy to the mirror for reversing the direction of oscillation thereof toward the opposing terminal point. Magnetic means provides a source force to induce oscillation from dead stop and to supplement the spring action by compensating for frictional and other energy losses during operation. Means are provided to bias the mirror to one of the terminal positions when inoperative. The mirror is powered at each terminal point and freely moves at a substantially constant angular velocity between the terminal points.

This invention relates to an arrangement for oscillating an element, such as a reflecting surface, back and forth in an arcuate path at a substantially constant angular velocity through a major arc segment.

15 Claims, 13 Drawing Figures

Spencer D. Howe,
INVENTOR.

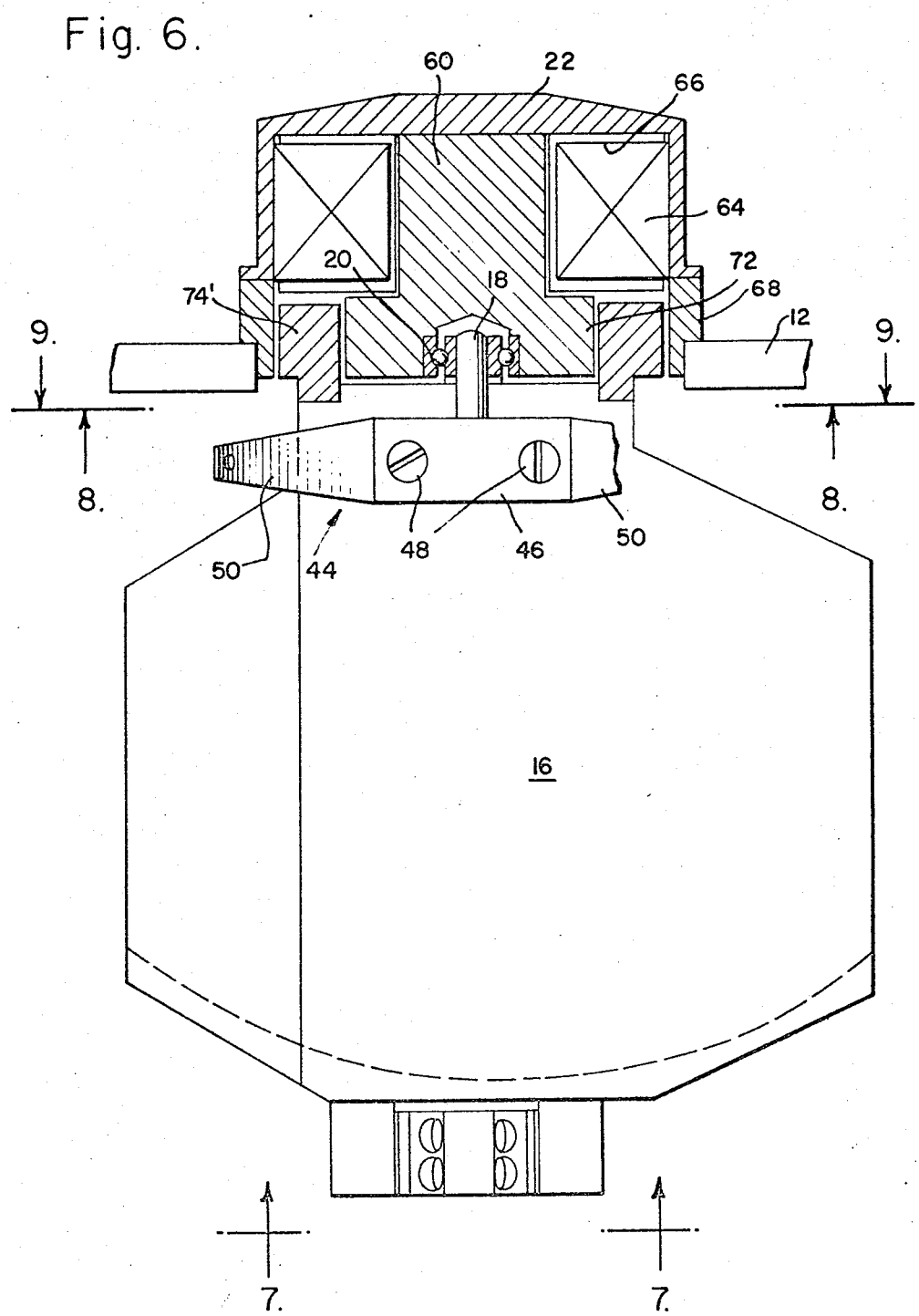

OSCILLATING MECHANISM

This application is a continuation of application Ser. No. 766,699, filed Oct. 11, 1968, now abandoned.

In the prior art, elements such as mirrors have been oscillated back and forth through a predetermined angle by various means in such a fashion that its angular velocity was essentially sinusoidal. Sinusoidal variation is undesirable in many applications. Substantially uniform velocity oscillation is preferable in many applications such as in area scans for electromagnetic radiation detectors.

Accordingly, it is a primary object of the invention to provide an arrangement wherein an element can be oscillated back and forth at a substantially constant angular rate.

A more particular object of the invention is to provide magnetic and spring means to drive an oscillating element at a substantially constant velocity through a major segment of the oscillating arc.

It is a further object of the invention to provide a mode of oscillating an element through a determined arc at a relatively constant velocity through a major segment of that arc and yet provide means to assure that the element will be biased to a terminal point when not operating under powered oscillation.

These and other objects and advantages of the invention will become apparent in the course of the following description of an illustrative embodiment thereof and from an examination of the related drawings of the embodiment, wherein.

Figure 3:
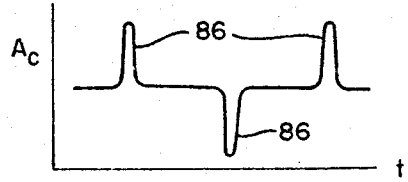
Figure 4:
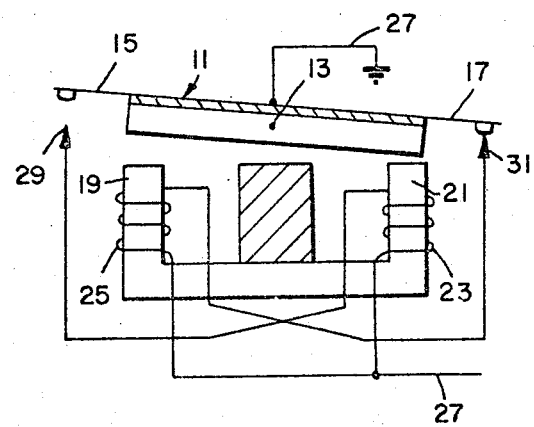
Figure 7:
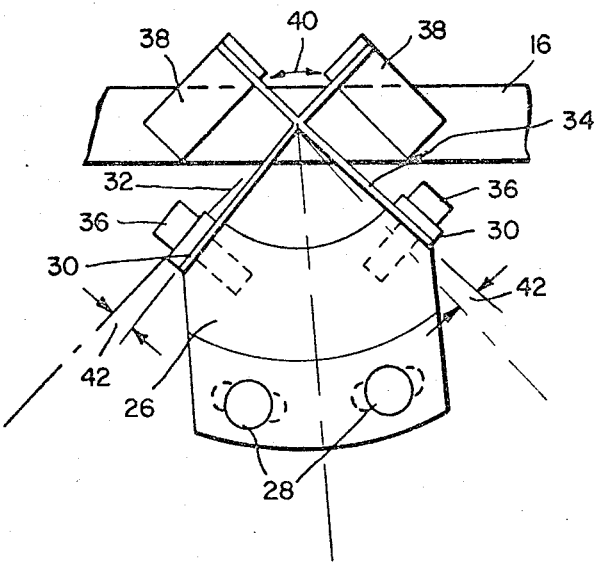
Figure 5:
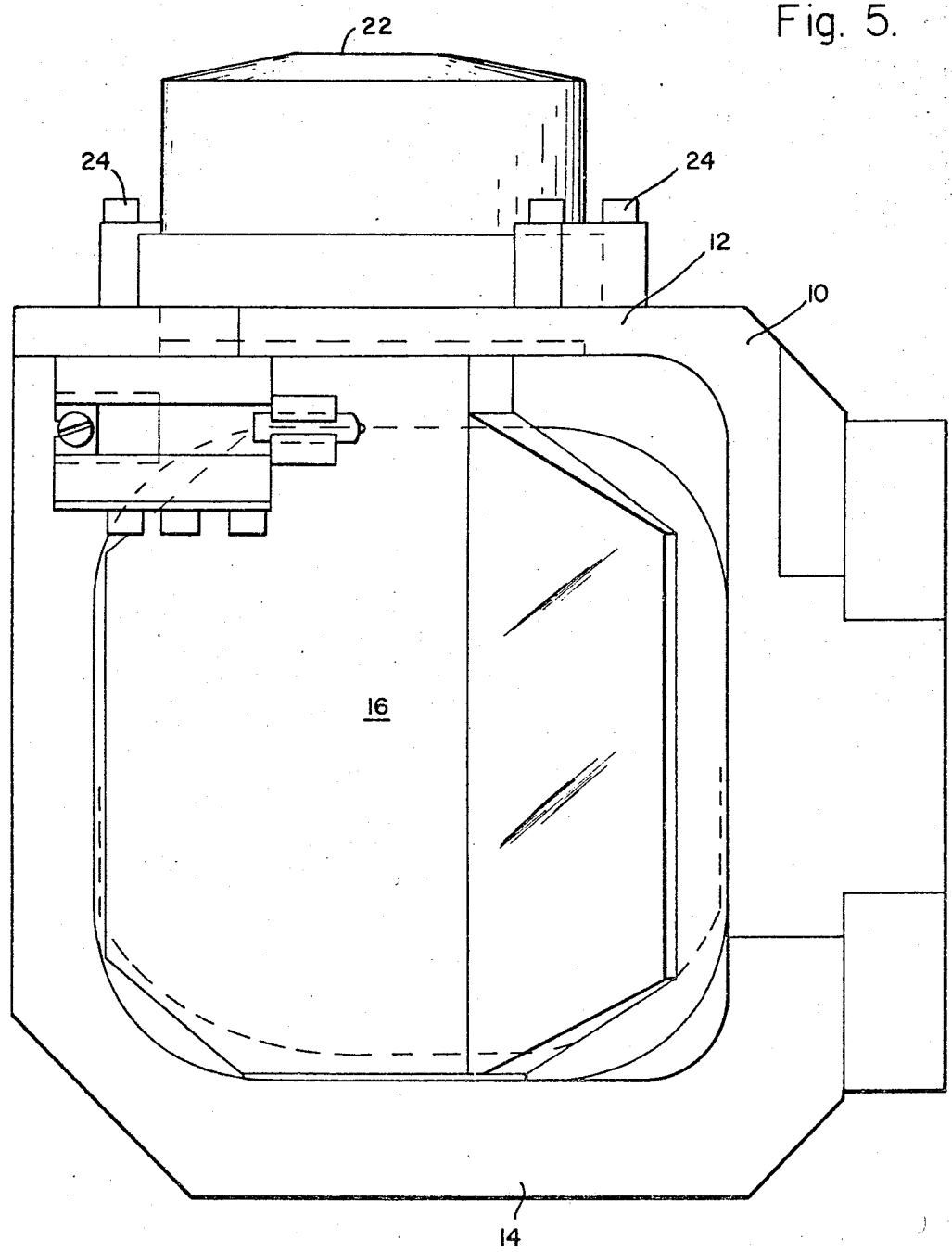
Figure 13:
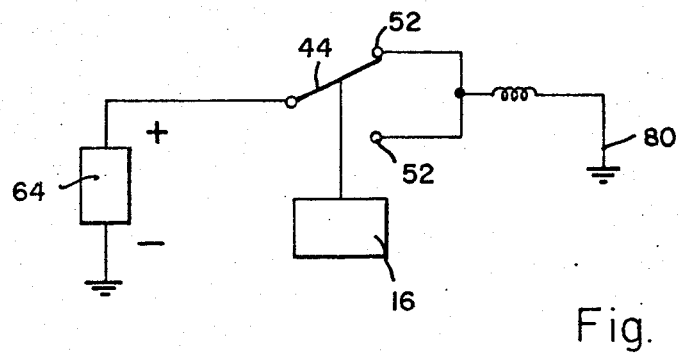
Figure 10:
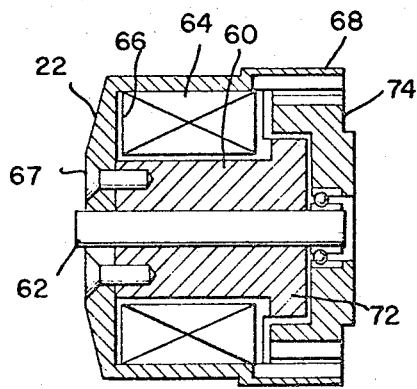
Figure 8:
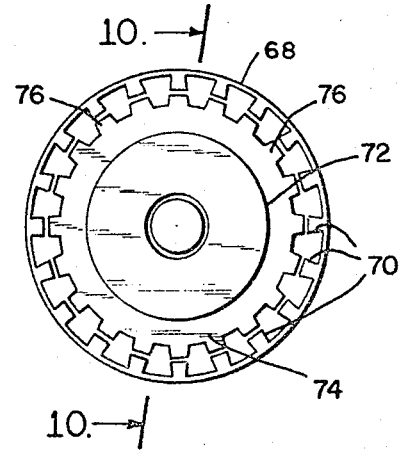
Figure 12:
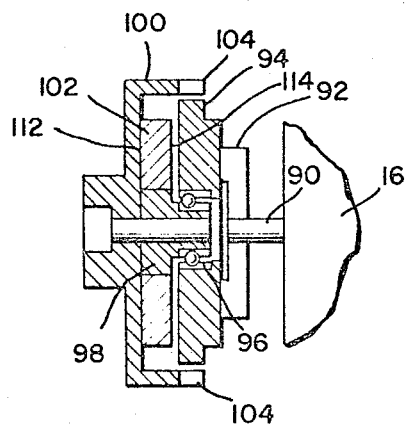
Figure 11:
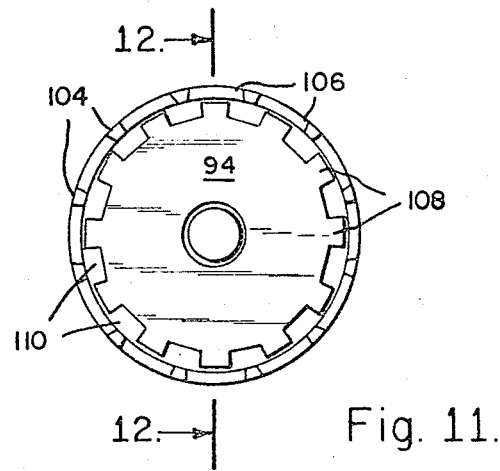
Figure 9:
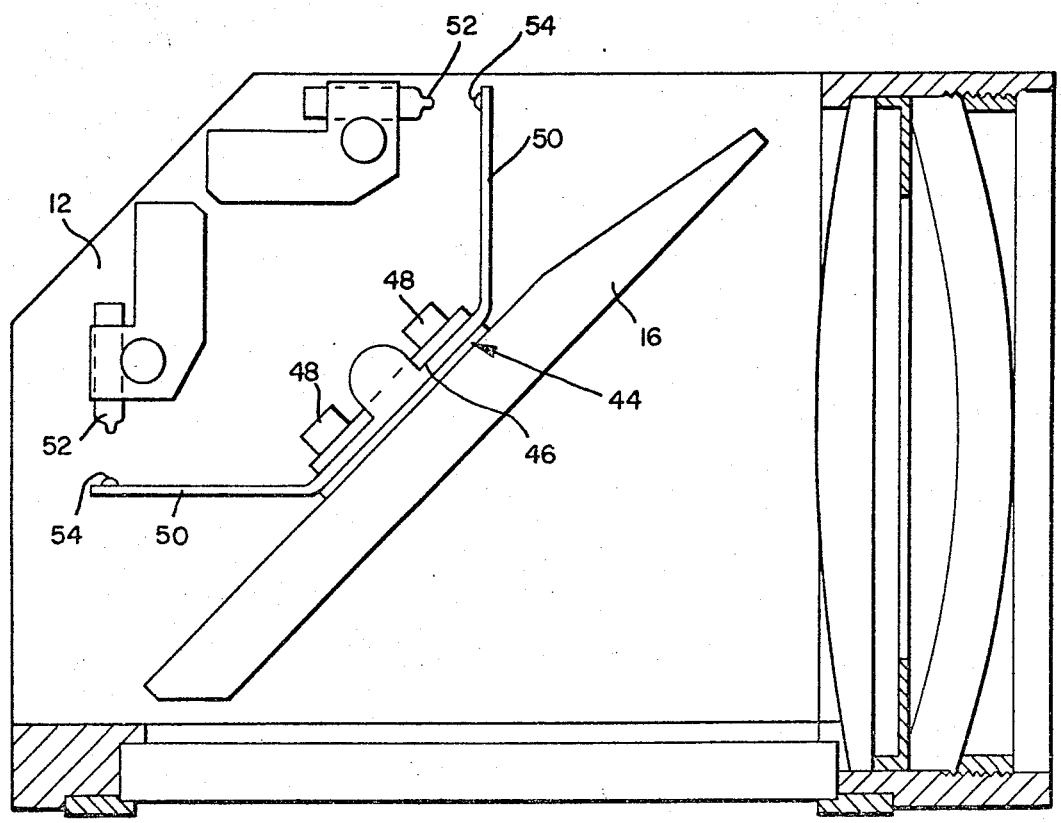

FIG. 3 is a time-acceleration curve for the moving member as a plot of torque versus time, FIG. 4 shows exemplary prior experimental structure, FIG. 5 is a side elevational view with a typical embodiment of the invention, FIG. 6 is an elevational view of the structure shown in FIG. 5, partially fragmented, to illustrate certain internal construction details, FIG. 7 is a fragmentary sectional view taken along lines 7—7 of FIG. 6, FIG. 8 is a fragmentary sectional view taken along lines 8—8 of FIG. 6, FIG. 9 is a fragmentary sectional view taken along lines 9—9 of FIG. 6 and illustrating the mirror structure and contact arrangement, FIG. 10 is a vertical sectional view taken along lines 10—10 of FIG. 8, FIG. 11 is a sectional view similar to FIG. 8 but showing a slightly modified construction of the invention, FIG. 12 is a sectional view taken along lines 12—12 of FIG. 11, and FIG. 13 is a schematic wiring diagram illustrating the electrical operation of the invention.

Directing attention to FIG. 4, it will be understood that the somewhat schematic oscillatory arrangement there illustrated is typical of certain laboratory structure used in experiments leading to the construction of the specific structure of the present invention. The oscillating element is indicated generally by the numeral 11 and comprises an appropriate structure mounted for pivotal movement as at 13. The cantilever springs 15 and 17 extend from opposed ends of the oscillating element 11. Magnetic coils 19 and 21 are provided at opposed ends of the element 11 and in operative spaced relation thereto. Magnetic devices 19 and 21 are provided with coils 23 and 25 appropriately connected to an electrical circuit or power source 27,27. The cantilever springs 15 and 17 contain contacts to engage abutments 29 and 31 during element oscillation. In operation, closure of the one of the contacts against abutments 29 or 31 causes current to flow to ground from power source 27 energizing the appropriate magnetic device, for example, as shown in the drawing, device 19 opposite the contact 31. The magnetism thus created in device 19 attracts the related end of the oscillating element 11 bringing it downwardly until contact 29 is engaged by the contact on cantilever spring 15. This engagement accomplishes two facets, that is, it energizes magnetic device 21 and also stores the kinetic energy of the oscillatory motion of the element 11 in the spring 15. The release of this energy from the spring coupled with the magnetic attraction set up at the device 21 induces movement of the oscillating element 11 in the opposite direction. It will be apparent that this oscillatory motion will continue as long as the magnetic devices are alternately energized and the springs allowed to store the kinetic energy of that motion to aid in the return movement of the element 11. Experience and experiment, however, has shown that the above described structure as well as known prior art oscillatory arrangements have been unable to produce the required uniformity of motion through a major segment of travel arc necessary to meet the high operating standards of many scanning arrangements as, for example, the referred to scanners for sensing electromagnetic radiation.

Describing the invention in detail and directing attention initially to FIGS. 5-9, it will be seen that a frame 10 is provided, same frame 10 having generally parallel spaced support plates 12 and 14. Interposed between the plates 12 and 14 is a mirror or reflecting element 16 which is mounted for oscillatory movement as will be apparent in the subsequent structural recitation.

As shown in FIG. 6 the mirror 16 has an upwardly projecting shaft 18, said shaft being received in bearings 20 mounted to a housing 22, said housing being supported in any conventional manner as by cap screws 24 to the upper plate 12 of the frame 10. The bearings 20 accommodate rotational and oscillatory movements of the shaft 18.

The illustration of FIG. 7 shows a block 26 adapted to be secured to the lower plate 14 by a pair of cap screws 28. This support block 26 provides a pair of mounting surfaces 30,30 which are respectively secured to flexure elements 32 and 34 by approximate cap screws 36, 36. The flexure elements 32 and 34 have their opposed ends captively received in spring support clamps 38, 38, which are fixedly secured to the lower aspect of the mirror 16 in any conventional manner, such as by welding or brazing. It will be particularly noted that the included angle 40 between the flexure springs 32 and 34, at the ends that are received in the spring clamps 38,38 is approximately 90°. It will also be noted that the mounting surfaces 30,30 are somewhat angled from the planes of captivity of the flexure springs in clamps 38, 38 as shown by the angles 42, 42 when the mirror is in neutral or dead center position in its arc of oscillating travel which results in a slight biasing force being exerted on the mirror 16 to normally bring it to an end position in its arc of oscillating travel. That is to say, the mirror is normally in a terminating position when the device described herein is not operating.

As shown in FIGS. 6 and 9 the mirror element 16 has secured thereto, at its upper aspect, a contact element indicated generally at 44. The contact element 44 has a central segment thereof 46 secured to the upper aspect of the mirror 16 as by cap screws 48, 48. Opposed ends of the contact element 44 are mounted in a cantilever manner as at 50, 50 and act in the capacity of cantilever springs during the action hereinafter described. The plate 12 has secured to the underside thereof electrical contact points 52, 52 each being in operative alignment with contact points 54, 54 secured to the cantilever ends 50, 50 of the contact element 44. It will be understood that alternate engagement between the contacts 52 and 54 at the respective ends of the contact element 44 define the termination points of the arc of movement of the mirror 16 in opposed directions and the physical engagement between the contacts provides a force storing effect for the segments 50, 50 in the release of which aids in the return movement of the mirror 16. The operation of this structure will hereinafter be described in more detail.

Attention is now directed to FIGS. 6, 8, and 10 for an understanding of the mode of inducing mirror oscillation. The housing 22 is secured to the upper plate 12 of the frame 10. The housing contains a magnetic core element 60 which may be centrally located therein about a central shaft 62 as in FIG. 10 or solid as in FIG. 6. The core, of course, is stationary. In addition to the core 60, the housing contains an appropriate coil 64. A nylon insulating member 66 provides electrical insulation between the coil 64, the housing 22 and the core 60. The housing 22 is secured to the core 60 via cap screws 67, 67. As is shown in FIG. 8, the outer aspect of the housing 22 at 68 has its internal periphery notched to provide inwardly directed bosses 70,70 around its inner periphery. The core 60, in turn, is provided with an annularly upraised radially outwardly directed shoulder or boss 72 which is aligned, as seen in transverse sectional view, with the bosses 70 on the outer housing. Rotors 74 or 74′ may be secured to mirror 16 in either the manner shown in FIGS. 6 or 10 depending upon the bearing arrangement selected to pivot the mirror. The rotors are annular in configuration and project into the housing 22 for interposition between the boss 72 and the bosses 70 of the housing 22. In the preferred form of the invention the rotor 74 is provided with a plurality of peripherally arranged radially outwardly directed bosses 76, 76. When the bosses 76 are in alignment with the bosses 70 of the housing 22 it will be understood that the mirror 16 is physically located in the exact central position of the arc of travel or oscillation between the opposed terminal points.

Attention is directed to FIG. 13, a schematic electrical diagram to help understand the operation of the device here under consideration. The switching element 44 is here diagramatically illustrated indicating that in response to the oscillation of the mirror 16, also diagramatically shown, the element 44 alternately makes contact with the respective upper and lower contacts 52, 52 as was described in reference to FIG. 9. A source of electrical power may be shown at 80 and the coil may be illustrated by the block diagram at 64 in FIG. 13. As a result of the oscillation described, the respective contacts are momentarily energized completing the circuit from the power source 80 through the coil 64 and setting up a magnetic field existence between the boss 72 and the respective bosses 70 as shown in FIGS. 8 and 10. It will be particularly noted that the magnetic field is set up only when the mirror element 16 is at the termination of its arcuate oscillatory movement in a given direction and only instantaneously during that period of time when there is physical engagement with the respective contact 52 or 54 on the springs 50, 50.

The operation of the device will be most readily understood when initial consideration is given to the fact that the flexure pivot arrangement shown in FIG. 7 normally biases the mirror 16 to a terminal position when the arrangement is inoperative. In this position, physical contact is made between one set of contacts 52 and 54 and the bosses 70 and 76 on the housing 22 and on the rotor 74 are out of alignment. It will be recalled that the showing of FIG. 8 is with the mirror in a central position on its oscillating arc.

With the contact 52 and 54 physically engaged, as electrical energy is applied to the arrangement, the coil 64 is instantaneously energized creating the magnetic field between boss 72 and the bosses 70 and exerting a magnetic torque toward the center on the bosses 76 of the rotor 74. This torque induces movement of the mirror 16 causing an opening of the then closed contacts 52 and 54 breaking the electrical circuits and eliminating the magnetic field. The mirror then moves smoothly to its opposed terminal position where the other contacts 52 and 54 on the opposed spring element 50 engage and the close the electrical circuits to again create the described magnetic field and induce a magnetic torque toward the center which reverses the motion of the mirror. In addition, the elements 50, 50 are in the nature of relatively stiff cantilever springs, accordingly, upon closure of the contacts 52 and 54 the kinetic energy of motion existent in the moving mirror is, to a great degree, stored within the engaged spring 50 by flexure thereof and accordingly when the oscillating motion ceases the stored energy releases itself from the spring also inducing a reversal of motion of the mirror. It will thus be apparent that this oscillatory motion will continue as long as electrical energy is applied to the arrangement to induce pulsing of the coil 64.

Figure 1:
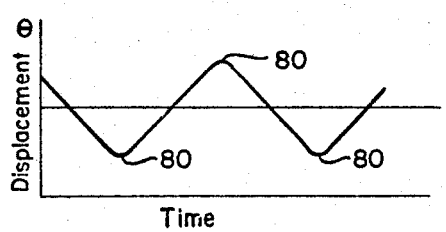
FIG. 1 is a time displacement curve of the moving oscillating member.
Figure 2:
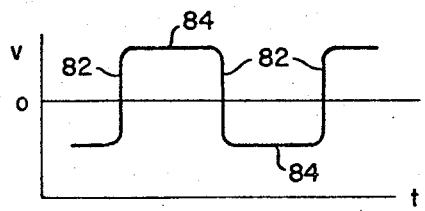
FIG. 2 is a time-velocity curve of the moving member.

Attention is now directed to FIGS. 1, 2 and 3 which illustrate, for the disclosed oscillating device, the time displacement curve, the velocity in relation to time curve, and the acceleration of the oscillating member in relation to time curve. It is desirable that the acceleration and/or deceleration of the oscillating member as it reaches the terminal points of its oscillating arc be extremely short in relation to time and that a relatively uniform velocity throughout a major portion of the arc of motion be effectively achieved for the purpose of maximizing the useful portions of each scan. As shown in FIG. 1, the device of the present invention provides a substantially constant time-displacement curve, except at the ends of the stroke of element 16 indicated at 80 wherein momentum is furnished the element for driving it towards the opposite terminal point. The velocity-time curve of FIG. 2 shows a substantially zero velocity indicated by indicia 82 at the stroke ends with constant velocity at indicia 84 as the element freely moves between the terminal points. In FIG. 3, the turn-around of element 16 is shown as short accelerations 86. Because of such short accelerations created by impulses to the element, it is recognized that an oscillating device having a totally constant velocity scan is for all practical purposes impossible to fabricate. However, the present invention has been found to have an increased usable portion of each scan by reason of each scan having a larger portion characterized by uniform or constant velocity.

As noted above, this result is extremely desirable in many types of scanning system currently being used in today's art. It is of course recognized that an oscillating device having a totally constant velocity scan is for all practical purposes impossible to fabricate. However, the present invention has been found to have an increased usable portion of each scan by reason of each scan having a larger portion characterized by uniform or constant velocity.

As earlier described, an important feature of the scanning system is the flexure pivot disclosed in FIG. 7. This allows the mirror 16 to be biased to an arc terminal position when not in operation, thereby making the device activation a simple matter, that is, power must only be applied to the electrical circuit to induce oscillation.

FIG. 11 and 12 illustrate a pivot arrangement which may be used in lieu of the flexure pivot disclosed in FIG. 7. The lower aspect of the mirror 16 or lower edge thereof is provided with a shaft 90 which is connected to a bracket 92, the bracket 92 being secured to a rotor 94. The rotor 94 is mounted on bearings 96 to accommodate mirror oscillation. A non-magnetic central shaft 98 supports bearing 96. The entire arrangement is contained in a housing 100, the latter having a rather narrow cylindrical ferrite permanent magnet contained therein and surrounding the non-magnetic shaft 98. Housing 100 is provided with projecting bosses 104, 104, said bosses being separated by cavities 106, 106 which have a peripheral linear dimension approximately twice the peripheral linear dimension of other bosses projecting radially outwardly, as at 108, 108 and formed on the rotor 94. The bosses 108 are separated by cavities 110.

Opposed surfaces 112 and 114 of the ferrite magnet 102 form north and south poles of the magnet and the permanent magnetic field created thereby passes from the pole 112 of the magnet 102 through the wall of housing 100, through the bosses 104 and downwardly through the rotor 94 to the other pole at surface 114 on the magnet. With the bosses 108 of the rotor 94 and the bosses 104 of the housing 100 positioned as shown in FIG. 11, it will be understood that the mirror 16 is in central position intermediate the terminal points of its oscillating arc, that is, as shown in FIG. 9 without contact being made at either end of the cantilever spring arms 50. In this position magnetic field tends to exert a torque on the rotor 94 in either direction depending upon precise alignment of the bosses 108 and 104 from that central position to magnetically torque or force physical alignment of the respective bosses 108 and 104.

As a result of this structure the mirror, when not in operation, will be magnetically torqued to one of the terminal arc positions thereby assuring that one set of contacts 52 and 54 may be mated, i.e., in contact when the arrangement is not in operation. Operation again merely requires the application of power to the coil 64 to induce oscillation of the mirror.

The last embodiment has a particular advantage in that there is no built in biasing stress in only one direction which naturally would result from the flexure spring arrangement of FIG. 7. However, the biasing stress of FIG. 7 is so slight that in normal relatively high velocity oscillating devices operating at a comparatively high number of cycles per second, the slight biasing force exerted by the flexure spring of FIG. 7 has little effect on the uniform velocity characteristic as shown by FIGS. 1–3 hereof. However, the biasing arrangement of FIGS. 11 and 12 may be advantageously used in those applications which specify slow velocity oscillation and a low number of cycles per second.

The invention shown is by way of illustration and not limitation and may be subject to various modification all within the spirit and scope thereof.

What is claimed is:

1. In a scanning device operable to move a scanning element in oscillating mode through a determined arc of travel, the combination of pivot means to accommodate said oscillating movement,
   combination means to initiate said oscillating movement at device start up and to maintain said oscillating movement during device operation,
   said combination means comprising a rotor carried by the oscillating element adjacent one end thereof,
   a magnetic core in a housing adjacent the rotor,
   coil means surrounding the magnetic core and internally of the housing,
   said housing being connected to said magnetic core and having a peripheral flange telescopically receiving said rotor,
   bosses on the peripheral flange operative to emanate magnetic flux when said coil is electrically energized,
   other bosses on the rotor of magnetically attractive material alignable with the bosses on the peripheral flange when the scanning element is at midpoint in its cycle of oscillation,
   spring means having first and second cantilever arm portions carried by the scanning element, said first and second cantilever arm portions being respectively alternately abuttable with first and second fixed electrical contacts at the terminal points of the arc of motion of said element,
   the engagement between a contact on said spring means and one of said fixed contacts being operable to close an electric circuit through said coil and thereby induce the creation of a magnetic field,
   the physical engagement between said first and second cantilever arm portions and the respective first and second fixed contacts being operable to alternately flex said spring means and store therein most of the kinetic energy of motion of said oscillating scanning element,
   said stored energy being releasable by said spring meanS upon termination of movement of said scanning element in either direction to thereby provide a mechanical biasing force to induce reverse motion of said scanning element,
   the magnetic field created by the engagement between the contact on said spring means and one of said fixed contacts being operable to create a magnetic biasing force to induce reverse motion of said scanning element,
   and means to bias said scanning element to a terminal point in its arc of movement upon device shutdown.

2. A scanning device operable to move a scanning element in oscillating mode through a determined arc of travel according to claim 1, wherein said last mentioned means comprises
   a flexure pivot at one end of said element supporting the element for oscillatory motion,
   said flexure pivot being slightly pre-stressed to provide a small biasing force to move the scanning element to a terminal point in its arc of movement upon device shutdown.

3. In a scanning device operable to move a scanning element in oscillating mode through a determined arc of travel according to claim 1, wherein said last mentioned means comprises
   a pivot on one end of said scanning element to accommodate said oscillating motion,
   a rotor carried by said last mentioned end of said scanning element,
   a second housing adjacent said last mentioned end of said scanning element,
   a permanent magnet within said second housing,
   bosses on the second housing to emanate the magnetic field created by said permanent magnet,
   other magnetically attractive bosses on the rotor physically disposed within the field created by said magnet,
   the bosses on said rotor having a peripheral dimension equal to about one-half of the peripheral dimension of the spaces separating the bosses on the housing,
   the bosses on the rotor being radially alignable with the bosses on the housing when the scanning element is at any terminal point in its arc of movement upon device shutdown.

4. An oscillating mirror system comprising:
   electromagnetic apparatus including a cylindrical magnetic core having first and second end portions, an annular electrical coil surrounding the first end portion of said magnetic core, and an annular stator surrounding the second end portion of said core,
   first and second electrical contacts,
   a power source operatively coupled to said first and second electrical contacts,
   a mirror assembly rotatably mounted on said second end portion, and along the longitudinal axis, of said magnetic core, said mirror assembly including a mirror, a rotor fixedly coupled to said mirror and having an annular portion interposed between said annular stator and said second end portion of said magnetic core, and a leaf spring member operatively coupled to said rotor and having first and second cantilever arm portions adapted to alternately contact the respective first and second electrical contacts for periodically energizing said electrical coil and thereby periodically creating a magnetic field between said second end portion of said magnetic core and said annular stator, said magnetic field serving to motivate bidirectional rotary movement of said mirror assembly.

5. The apparatus defined by claim 4 wherein said annular stator is adapted to have a plurality of radially extending portions along the internal periphery thereof, and said rotor is adapted to have a plurality of radially extending portions along the external periphery thereof, the number of radially extending portions on said annular stator and said rotor being equal.

6. The apparatus defined by claim 4 wherein said mirror assembly is rotatably mounted on said second end portion of said magnetic core by a flexure pivot adapted to mechanically bias one of said first and second cantilever arm portions to be in physical contact with an associated one of said first and second electrical contacts when said electromagnetic apparatus is de-energized.

7. A mechanism including an element oscillable in limit cycle at a substantially uniform velocity between a pair of terminals, primary energy storage means couplable to said element only at said terminals for receiving, storing and returning kinematic energy to said element during the time of respective contact with said terminals and for driving said element from a first of said terminals toward a second of said terminals and secondary driving means coupled to said element and acting in conjunction with said primary energy storage means for overcoming energy losses during oscillation of said element.

8. A mechanism including an element oscillable through an arc and alternately contactable with a pair of terminals positioned at the ends of the arc, and motive means couplable to said element upon contact thereof alternately with said terminals and operative only during duration of the contact to impart energy to said element for movement thereof from a first of said terminals toward a second of said terminals.

9. A mechanism as in claim 8 wherein said motive means includes primary energy storage means to receive, store, and return the greater portion of the energy to said element at each end of the cycle and secondary motive means to overcome energy losses during oscillation of said element.

10. A mechanism as in claim 9 wherein said primary energy storage means comprises spring means biasable to store energy in and to subsequently release energy from said element upon the contact thereof alternately with said terminals.

11. A mechanism as in claim 10 wherein said secondary motive means comprises an electromechanical actuator and two pairs of electrical contacts respectively positioned on said element and on said terminals for alternate energization of said actuator upon the contact of said element alternatively with said terminals.

12. A mechanism as in claim 11 further including biasing means coupled to said element and said terminals for biasing said element at one of said terminals when said element is at rest.

13. A mechanism as in claim 10 wherein said spring means comprises a pair of cantilever arms secured to said element and alternatively contactable with said terminals.

14. A mechanism is in claim 9 wherein said secondary motive means comprises an electromechanical actuator energizable only upon the contact of said element alternatively with said terminals.

15. A mechanism including an element oscillable through an arc and alternately contactable with a pair of terminals positioned at the ends of the arc, and motive means couplable to said element upon contact thereof alternately with said terminals and operative upon the contact to impart energy to said element for movement thereof from a first of said terminals toward a second of said terminals; said motive means including primary motive means to impart the greater portion of the energy to said element and secondary motive means to overcome energy losses during oscillation of said element; said secondary motive means comprising an electromechanical actuator energizable upon the contact of said element alternatively with said terminals; and said actuator comprising a rotor mounted on said element and a stator mounted on a support, said terminals secured to said support, said rotor and said stator having cooperative bosses with spacing therebetween for carrying a magnetic field.

* * * * *